United States Patent [19]

Kitajima et al.

[11] Patent Number: 4,495,570
[45] Date of Patent: Jan. 22, 1985

[54] PROCESSING REQUEST ALLOCATOR FOR ASSIGNMENT OF LOADS IN A DISTRIBUTED PROCESSING SYSTEM

[75] Inventors: Hiroyuki Kitajima; Kazuhiko Ohmachi, both of Yokohama, Japan

[73] Assignee: Hitachi, Ltd., Tokyo, Japan

[21] Appl. No.: 337,812

[22] Filed: Jan. 7, 1982

[30] Foreign Application Priority Data

Jan. 14, 1981 [JP] Japan .................. 56-2793[U]

[51] Int. Cl.³ .................. G06F 15/16; G06F 3/04
[52] U.S. Cl. .................................. 364/200
[58] Field of Search ... 364/200 MS File, 900 MS File

[56] References Cited

U.S. PATENT DOCUMENTS

| | | | |
|---|---|---|---|
| 4,096,571 | 6/1978 | Vander Mey | 364/200 |
| 4,115,866 | 9/1978 | Janssens et al. | 364/900 |
| 4,145,739 | 3/1979 | Dunning et al. | 364/200 |
| 4,153,934 | 5/1979 | Sato | 364/200 |
| 4,213,178 | 7/1980 | Diez et al. | 364/200 |
| 4,214,305 | 7/1980 | Tokita et al. | 364/200 |
| 4,263,649 | 4/1981 | Lapp, Jr. | 364/200 |
| 4,375,639 | 1/1983 | Johnson, Jr. | 364/200 |
| 4,376,982 | 3/1983 | Bantz et al. | 364/900 |
| 4,387,425 | 6/1983 | El-Gohary | 364/200 |
| 4,394,728 | 7/1983 | Comfort et al. | 364/200 |

Primary Examiner—Jerry Smith
Assistant Examiner—Gary V. Harkcom
Attorney, Agent, or Firm—Antonelli, Terry & Wands

[57] ABSTRACT

A distributed processing system having a plurality of processors and/or terminals at a plurality of locations is provided with a processing request allocator which includes a device for storing the waiting time at each processor or terminal for beginning the execution of a service request as well as a device for storing the delay in communication from each location of a processor or terminal to each other processor or terminal in the system. The processing request allocator has a device for calculating the sums of the waiting time and delay for each route through the system where a processing request from a first location is executed by a predetermined processor and the processing result is sent to a second location within the system, and a device is provided for determining the minimum value of these sums to identify the processor or terminal to which the service request is to be allocated. Since a processor or terminal is selected to perform the processing of the service request on the basis of not only the waiting time at each processor but also the communication delay, the performance of the overall system is enhanced and the response time to each service request is minimized.

11 Claims, 2 Drawing Figures

PROCESSING REQUEST ALLOCATOR FOR ASSIGNMENT OF LOADS IN A DISTRIBUTED PROCESSING SYSTEM

BACKGROUND OF THE INVENTION

This invention relates to a processing request allocator in a distributed computing system.

There is known a distributed computing system in which a plurality of computers and terminals are coupled by communication channels and the communication between the computers and the sharing in processing service requests between the computers are made so that the overall performance and availability of the system are enhanced. This conventional distributed computing system interprets the names of a program and file necessary for the execution of each service request issued from the terminals or computers, and allots the service request to a computer having such program or file. In this case, a plurality of computers may have such necessary program or file. The decision of which computer the service request is allotted to affects not only the response time to the service request, but also the performance of the whole distributed computing system. In the prior art, any one of the following systems have been used:

(1) When a plurality of computers can process a service request, the problem of which computer the request is to be allotted to is decided by an operator or on the basis of predetermined operational rules.

(2) Each service request is moved along a constant path within the distributed computing system and processed at the first computer which can process the service request on the path.

These systems cannot take into consideration the current load level of each computer or the communication delay at each computer in its decision of allotment. Therefore, there are drawbacks that (1) unequal loads may be applied to the computers, resulting in unfair response time to service requests, (2) the loads to some computers may be too low and thus the utilization efficiency thereof may be lowered, and (3) some service requests may be allotted to computers requiring too long a communication delay and thus the response time may be too long.

SUMMARY OF THE INVENTION

It is an object of this invention to provide a distributed computing system in which the above drawbacks of the prior art are obviated, which can minimize the response time to each service request and which distributes the loads to a plurality of computers uniformly, thereby enhancing the utilization efficiency of the system.

The distributed processing systems of this invention may include geographically-distributed systems, locally-distributed systems, multi-computer systems and the like.

In accordance with one embodiment of the present invention, there is provided a processing request allocator for deciding which computer each service request is to be allotted to, this processing request allocator operating to periodically collect the information on processing waiting time at each computer and the communication delay between respective locations within the distributed computing system. The processing request allocator, based on this information, allots the service request to a computer in which the sum of the processing waiting time at the computer and the associated communication delay is a minimum.

DESCRIPTION OF THE PREFERRED EMBODIMENTS

Figure 1:
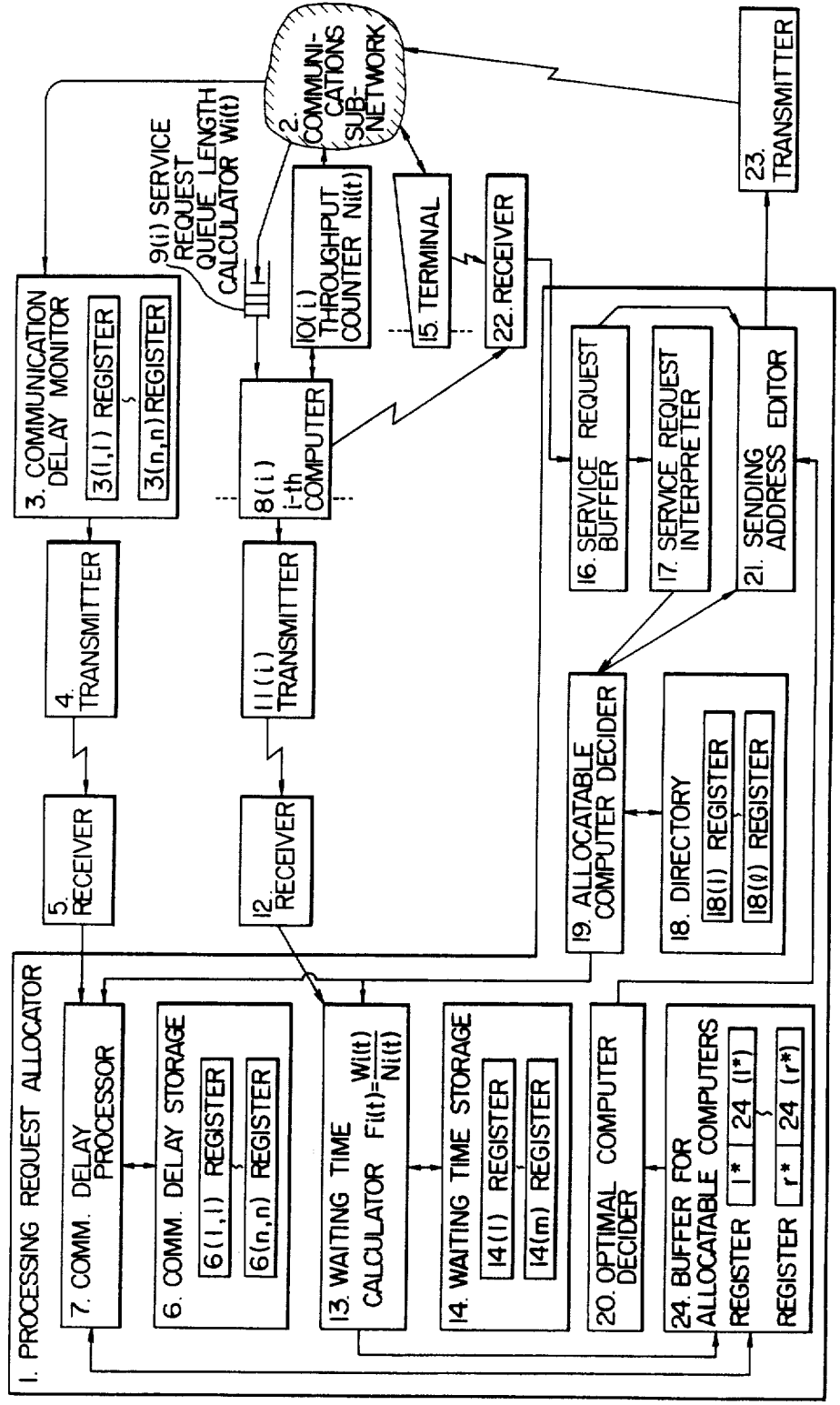
FIG. 1 is a block diagram of a distributed computing system forming one embodiment of this invention.

An embodiment of the invention will hereinafter be described in detail with reference to FIG. 1. FIG. 1 is a block diagram of the embodiment. Referring to FIG. 1, there are shown a processing request allocator 1, a communications subnetwork 2, and a communication delay monitor 3 for storing and renewing the values of the delays of communications among all the computers, terminals, and processing request allocator at each point in time, and registers 3(1, 1) to 3(n, n) where 1 to n within parentheses represent respective ones of all the computers, terminals and processing request allocator in the distributed computing system. Symbol 3(i, j) indicates a register for storing a communication delay in a path from element i to element j. Shown at 4 is a transmitter, 5 a receiver, and 6 a communication delay storage for storing the same information as in the communication delay monitor 3, that is, 6(1, 1) to 6(n, n) represent registers for storing the same information as in the elements 3(1, 1) to 3(n, n). Shown at 7 is a communication delay processor for retrieving and renewing the contents of the communication delay storage 6, 8 each computer, 9 a service request queue length calculator for counting the number of service requests waiting for processing at the respective computers (normally, called job queue). Shown at 10 is a throughput counter for counting the number of processings per unit time (or throughput) at each computer and at each time, 11 a transmitter, 12 a receiver, 13 a waiting time calculator for calculating a predicted value of the waiting time at each computer and at each time point and retrieving and for renewing the contents of the waiting time storage 14. The waiting time storage 14 stores a predicted value of the waiting time at each computer and at each time; 14(1) to 14(m) represent registers included in the waiting time storage 14 where 1 to m correspond to all computers included in the distributed computing system. For example, 14(i) is a register for storing a predicted value of the waiting time at the i-th computer. Shown at 15 is a terminal, 16 a buffer for temporarily storing service request information, 17 a service request interpreter for interpreting names of programs and/or files necessary for execution of each service request, and 18 a directory for storing the identification symbols of those computers having each program or each file. Symbols 18(1) to 18(l) are registers included in the directory 18, where 1 to l represent the respective names of files and programs in the distributed computing system. For example, in the register 18(k) is stored an identification signal of a computer in which file k or program k is provided. The register 18k may identify a plurality of computers. Shown at 19 is an allocatable computers decider, and 20 an optimal computer decider for deciding a computer where the sum of the predicted waiting time and the communication delay is the minimum. Shown at 21 is a sending address editor for adding an identification signal of a computer selected as a sending address for the service request (where the request is to be processed), 22 a receiver, 23 a transmitter, and 24 a buffer for allocatable computers. 24(1\*) to 24(r\*) are registers included in the buffer 24, for storing at the front portion identifying signals on the allocatable computers and storing at the rear portion the sum of the communication delay and the predicted waiting time at a computer. The other elements are known as in the conventional distributed computing system. In particular, the communication delay monitor 3 stores and renews the communication delay between the elements in the communications subnetwork 2 in order to allot to each service request a path where the communication delay at that time is a minimum. Although any number of processing request allocators 1 may be provided in the distributed computing system, which processing request allocator the service request from each terminal or computer is given to should be predetermined, or decided by an operator at each service request in such cases.

The operation of the embodiment of the construction as set forth above will hereinafter be described.

The communication delay monitor 3 transfers information in the registers the contents of which are changed at a predetermined period, through the transmitter 4 and the receiver 5 to the communication delay processor 7 at each constant period. The communication delay processor 7 receives the information and renews the contents of the corresponding registers in the communication delay storage 6. The throughput counter 10($i$) connected to each computer 8($i$) (where $i=1, \ldots$ m) divides the number of service requests completed within a given constant period of time, t, by the length of the period thereby to determine a throughput Ni(t) in the period, t, and then it reports the throughput to the i-th computer. The service request queue length calculator 9($i$), at the end of the period t, calculates the number Wi(t) of service requests waiting at the service request queue of the computer 8($i$) and reports it to the computer 8($i$). As soon as the computer 8($i$) receives this data from the calculator 9($i$) and counter 10($i$), it transfers the identification signal i of the computer, and the service request queue length Wi(t) and throughput Ni(t) reported as above, to the waiting time calculator 13 through the transmitter 11($i$) and the receiver 12. The waiting time calculator 13 calculates the predicted waiting time Fi(t) at each i-th computer in the period t as $$Fi(t) = Wi(t) \pm Ni(t) \qquad (1).$$

Then, the calculator 13 renews the contents of the register 14($i$) associated with the i-th computer in the waiting time storage 14, with the value of Fi(t). The operation in response to each service request will next be described. A service request from a given terminal or computer, as described above, is sent to the particular processing request allocator 1 by a predetermined correspondence, or by the direction of an operator. The allocator 1 causes the received service request to be temporarily stored in the buffer 16. The service request interpreter 17 reads the highest priority service request information from the buffer 16 and identifies the names of the program and/or file necessary to execute the service request and the identification signal of the terminal or computer which is to produce the result of processing. The service priority is determined by the information on the emergency degree given to each service request beforehand, the length of staying time of the corresponding service request in the buffer 16 and so on. Moreover, the names of the necessary program and/or file and the identification signal of the terminal or computer as set forth above are included in the corresponding service request information, and can be interpreted by the service request interpreter 17. Consequently, the interpreter 17 transfers the names of the program and/or file necessary for the execution of the corresponding service request, and the identification signal to the allocatable computer decider 19, which then retrieves the identification signal of the computer having all the names of the programs and/or files thus transferred, from the directory 18. When there is no computer satisfying the above conditions, this result is sent as a message to the sending address editor 21, which applies to it the identification signal of the sender terminal or computer that issued the service request, as a sending (receiver's) address to the transmitter 23 from which it is transmitted. Then, the sending address editor 21 erases the stored contents on the service request from the buffer 16. If there is only one computer satisfying the above conditions, the allocatable computer editor 19 transfers the identification signal of the computer to the sending address editor 21. The sending address editor 21 reads the stored contents of the service request from the buffer 16 and adds to it the identification signal of the computer as a receiver's address, which is then transmitted by the transmitter 23. If there are a plurality of computers satisfying the above conditions, the optimal computer is determined as follows in which the sum of the communication delay and the predicted waiting time at the computer is the minimum. The allocatable computer decider 19 transfers the identification signal of a group of computers satisfying the conditions to the waiting time calculator 13, and the identification signal of the receiver's address and the former identification signal to the communication delay processor 7. Now, let the identification signals of a given computer satisfying the conditions and the sending address be represented by p\* and e\*, respectively. Then, the waiting time calculator 13 reads the contents of the register 14(p\*) corresponding to each p\*, of the waiting time storage 14 and writes the contents of each p\* and the register 14(p\*) in the front and rear portions of a given unused register of the buffer 24 for allocatable computers, respectively. Then, the communication delay processor 7 executes for each p\* the following operations. That is, the processor 7 retrieves the communication delay storage 6, reads the communication delay in a path from the processing request allocator 1 to the computer p\*, and from the computer p\* to the sending address e\*, adds these delays, reads the contents of the rear portion of the register with the front portion including p\*, of the buffer 24 for allocatable computers, and then renews the contents of the rear portion with the sum, 24(p\*) of the added result and the contents of the rear portion. As a result, in the rear portion is stored the sum of the communication delay and the predicted value of the waiting time at the computer when the service request is allotted to the computer p\*. Then, the optimal computer decider 20 checks the rear portions of the registers of the buffer 24 to decide a register with the minimum value included in the rear portion, and reads the contents of the front portion of that register. The contents show the identification signal of the computer to which the service request is to be allotted. The optimal computer decider 20 transfers the contents to the sending address editor 21, which then reads out the stored contents on the service request from the buffer 16, and adds to it the identification signal of the computer to which the above service request is to be allotted, as a sending address, the added result being sent from the transmitter 23. Thus, since the processing request allocator 1 has finished the allocation processing of the service request, the allocator 1 erases the stored contents of the service request from the buffers 16 and 24.

Consequently, the service request transmitted from the transmitter 23, since it is added with the identification signal of the computer to which the service request is allotted, is transferred to the specified computer by the information transfer function which the communications subnetwork 2 has.

In the above embodiment, the service request interpreter 17 checks the contents of each service request and then interprets the names of the file and/or program necessary for execution. However, the following system is sometimes employed instead of the above system. That is, if a file and/or program is required as each service request is executed, a request therefor (called task request) is issued. In this case, since the names of the file and/or program necessary for each service request are not known in advance, even if the service request is allotted to a computer, it will be necessary to execute a task request issued during execution of a request by another computer unless that computer has a file and/or program required for this execution. The fundamental idea for this case is as follows. First, the allotment of a service request to the computer is performed under the assumption that a task request is not issued. Then, when a task request is issued during execution of a service request, and when the task request cannot be executed, the allotment of the task request is performed by the way as shown in FIG. 1. After the end of the task request, the request is returned to the original computer where the execution of the service request is resumed.

Figure 2:
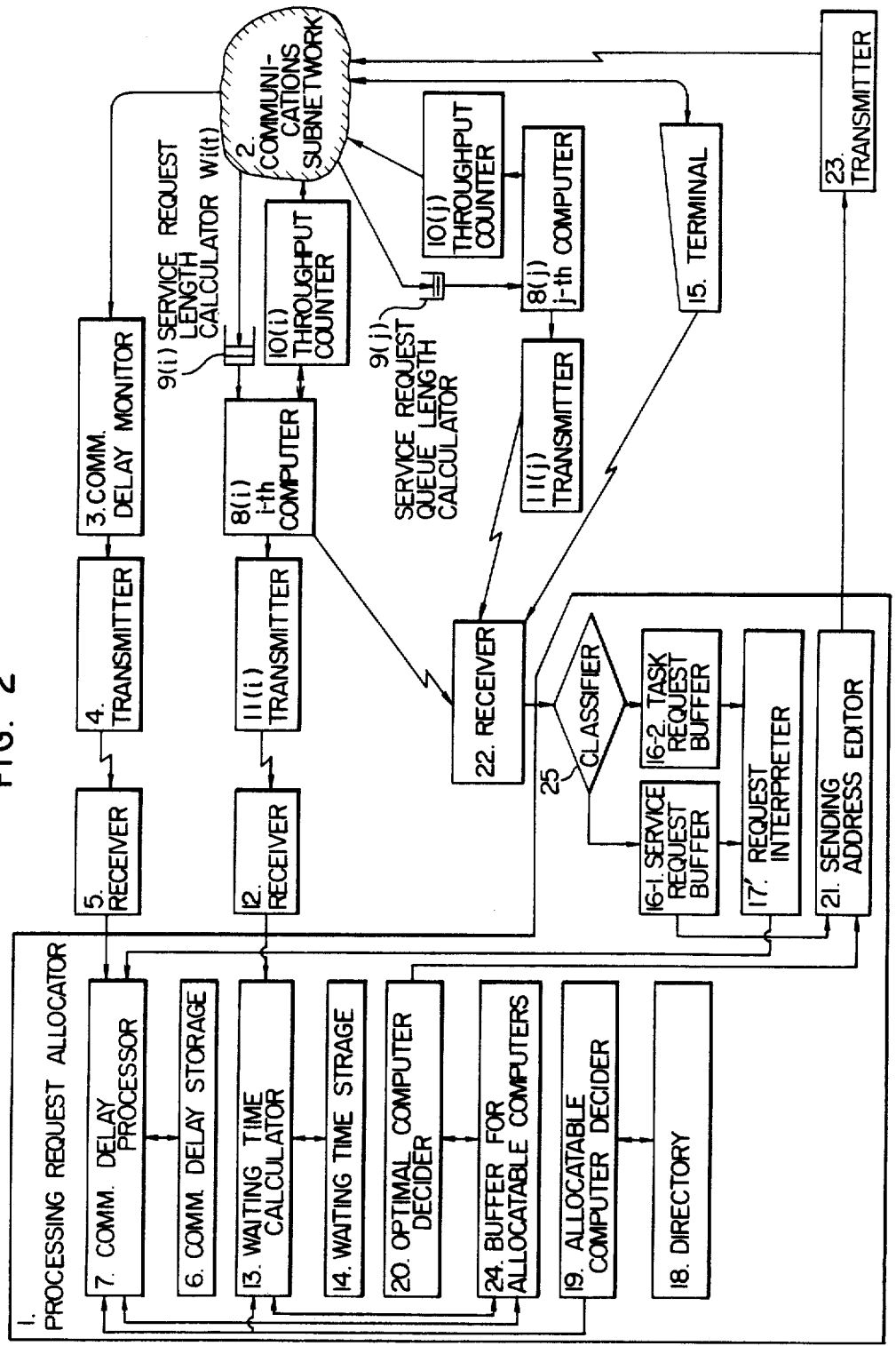
FIG. 2 is a block diagram of a distributed computing system forming another embodiment of this invention.

This way of operation will hereinafter be described in detail with reference to another embodiment of FIG. 2. Shown at 25 is a classifier for deciding whether the transferred information is a service request or a task request, and transferring each to the corresponding buffer. Numeral 16-1 represents a service request buffer for temporarily storing the service request information, 16-2 a task request buffer for temporarily storing the information of the task request, and 17' a service request interpreter for interpreting the names of the program and/or file required to execute each service request or each task request. Other reference numerals represent the same elements as those indicated by like reference numerals in FIG. 1.

The operation of the embodiment of FIG. 2 will be described below. The communication delay storage 6 and waiting time storage 14 renew their contents in the same way as in FIG. 1. A service request issued from a given terminal or computer is transferred to a particular processing request allocator 1 by a predetermined correspondence or by the instruction of an operator. The allocator 1 first causes the received service request to be temporarily stored in the service request buffer 16-1. The service request interpreter 17' reads the highest priority service request or task request from the service request buffer 16-1 or task request buffer 16-2. The operation in the case where a task request is selected will be described later, and the operation in the case where a service request is selected will first be described below. The service request interpreter 17' interprets the identification signal e of a terminal or computer which is to produce the processing result on the basis of the contents of the service request. Then, the interpreter 17' transfers the identification signal of the sending address to the communication delay processor 7, which then executes the following operations for all the computers $8(i)$ (i = 1, ... m). That is, the processor 7 retrieves the communication delay storage 6, reads the communication delays in a path from the processing request allocator 1 to the computer $8(i)$, and from the computer $8(i)$ to the sending address e, adds these delays, and writes each i and the added result in the front and rear portions of a register of the buffer 24 for allocatable computers. Then, the waiting time calculator 13 reads the contents of the register $14(i)$ corresponding to each i (i = 1, ... m) from the waiting time storage 14, then reads the contents of the rear portion of the register with the front portion including i, from the buffer 24 for allocatable computers, and renews the contents of the rear portion by the sum of the contents of the waiting time storage $14(i)$ and the contents read as above. Then, the optimal computer decider 20 checks the rear portions of the registers of the buffer 24 to select a register of the minimum value and reads the contents of the front portion of the register. The following operations for the service request are the same as in FIG. 1. As a result, the service request is allotted to one of the computers, for example, $8(i)$.

The method of the allotment of a task request will be described below. If a necessary file or program appears in the course of executing the service request, a task request therefor is issued. The computer $8(i)$ decides whether or not it has the requested file or program. If it has, it allots the requested file or program to the service request, and if it does not have, it transfers the task request via the transmitter $11(i)$ and the receiver 22 to the processing request allocator 1. The task request is allowed to include not only the names of the necessary program or file but the identification signal of the computer $8(i)$ to which the service request is allotted, as a sending address. The task request is transferred to the task request buffer 16-2 by the classifier 25, and read therefrom by the service request interpreter 17'. The subsequent operations for the task request are equivalent to the operations for the task request in FIG. 1 by the replacement of the service request with the task request. As a consequence, if there is no computer having the necessary file name or program name, the result is reported to the computer $8(i)$. If there is, the task request information is transferred to a computer where the sum of the communication delay on the task request and processing waiting time at the computer is the minimum, for example, $8(j)$. As described above, since the computer $8(i)$ to which the result is supplied is specified for the task request, the computer $8(j)$, after processing the task request, transfers the result to the computer $8(i)$. Then, the computer $8(i)$ executes the operation for the service request subsequent to the task request.

As described above, according to the invention, when a plurality of computers have the file and/or program necessary for the execution of a given service request or task request issued from a terminal or computer, the service request or task request is allotted to a computer where the sum of the waiting time at the computer and the communication delay is the minimum. Consequently, the response time to each service request or task request can be minimized, the loads on a plurality of computers can be made uniform, and the utilization efficiency thereof can be increased.

Moreover, when some of the computers are in trouble, the corresponding computer 8 reports this fact to the waiting time calculator 13, by which the corresponding register of the waiting time storage 14 is set to an extremely high predicted waiting time. Thus, when some of the computers are in trouble, the service request or task request is automatically allotted to other allocatable computers.

Furthermore, when part of the communications subnetwork 2 is in trouble, the failure is reported to the communication delay processor 7 by the communication delay monitor 3, so that an extremely high value is set in the corresponding area of the communication delay storage 6. Thus, allotment to a computer through the failure point can automatically be prevented.

For the above reasons, this invention is advantageous from the point of view of the reliability of the distributed computing system.

We claim:

1. In a distributed processing system including a plurality of computers and terminals connected to each other through communication lines for performing service requests issued by one of said computers or terminals; a processing request allocator in communication with said computers and terminals for deciding which computer or terminal each service request is to be allotted to, comprising means for collecting information on the waiting time to start processing for a service request at each computer and terminal and on the communication delay time to receive information necessary to execute a service request from respective locations of each of said computers and/or terminals within the distributed processing system, means responsive to a service request for determining which program is necessary to perform the service request and further determining which computers and/or terminals have the necessary program, and means responsive to said collecting means and said determining means for allotting said service request to a selected computer or terminal having the necessary program to execute the service request and where the sum of the processing waiting time at the selected computer or terminal and the communication delay time associated with the selected computer or terminal is a minimum as compared to that of the other allocatable computers as terminals for the service request.

2. In a distributed processing system including a plurality of computers and/or terminals distributed and connected to one another from respective locations through a communications subnetwork, a method of allotting one of said computers or terminals for executing a service upon request for the service from another one of said plurality of computers and/or terminals, comprising:
   a first step of reading a service request from a computer or a terminal and analyzing at least the name or identification signal of a program required for executing the service request;
   a second step of searching for those computers and terminals which are allocatable to the service request in that they have said required program;
   a third step, when there exists a plurality of allocatable computers each having the required program, of determining a predicted waiting time to start execution of the service request at each allocatable computer and/or terminal and an associated communication delay time to receive necessary information for execution of the service request in said communications subnetwork for each computer and/or terminal; and
   a fourth step of selecting one allocatable computer or terminal for which the sum of the communication delay time and the predicted waiting time at the selected computer or terminal takes a minimum as compared to the other allocatable computers or terminals and allotting the service request to this selected computer.

3. A method according to claim 2, wherein said first step includes, when there are a plurality of service requests from a plurality of computers and/or terminals, analyzing the names of programs required for executing the service requests in the order of higher priority to lower priority.

4. A method according to claim 2, wherein the first step includes reading the name of a program and file required for executing a service request and an identification signal of a terminal or a computer to which the result of execution is to be outputted.

5. A method according to claim 2, wherein the third step includes providing the predicted waiting time at each computer or terminal from a number Wi(t) of service requests waiting at a service request queue at each computer or terminal at a given period (t) and a throughput Ni(t) representing the number of service requests executed in the given period (t).

6. A method according to claim 2, wherein the third step includes providing said communication delay time on the basis of communication delay times between means for allotting the service request and each computer or terminal having the required program for executing the service request and between each computer and a computer or a terminal to which the result of execution is to be sent.

7. A method according to claim 2, further comprising a step of calculating said predicted waiting times and said communication delays at a predetermined period and renewing these values periodically.

8. A method according to claim 2, further comprising a step, upon occurrence of a malfunction in a computer or terminal, of setting the predicted waiting time for the computer or terminal at a predetermined value larger than the predicted waiting times of other computers or terminals.

9. A method according to claim 2, further comprising a step, upon occurrence of a malfunction in part of the communications subnetwork, of setting the communication delay times between any computer or terminal and such computer or terminal which utilizes the malfunctioning part of the subnetwork for communication at a predetermined value larger than the communication delay times for other lines.

10. In a distributed processing system including a plurality of computers and/or terminals distributed in the system and connected from respective locations through a communications subnetwork, a method of allotting a computer or a terminal for executing a job upon request for the job from one of said plurality of computers and/or terminals and for allotting a task upon receipt of a request message of the task generated during said execution of a job request, comprising the steps of:

a first step of discriminating according to said request message whether a generated request is a job request or a task request;

a second step of, when the request is found to be a job request, reading the identification signal of the terminal or computer to which the execution result is to be outputted;

a third step of determining the communication delay times representing times to receive information necessary to execution of a service request between means for allotting the job and each of said computers or terminals and between each of said computers or terminals and the terminal or computer to which said execution result is to be outputted;

a fourth step of calculating a predicted waiting time of each of said computers or terminals indicating the time before each computer or terminal can start execution of a service request; and a fifth step of determining the sums of said communication delays and said predicted waiting times for each of said computers or terminals and allotting the job to the computer or terminal associated with the minimum of said sums and;

a sixth step of, when the discrimination result of said first step is a task request, reading the name of a required program and file for executing the request, searching for a selected computer or terminal having the required program and file and allotting the execution of the task request to the selected computer.

11. A method according to claim 10, further comprising the step, when there exists a plurality of computers or terminals having the required program and file for executing the task request, of determining the sums of the expected waiting time for each of said plurality of computers or terminals, the communication delay between each of the computers or terminals and the computer or terminal executing the allotted request, and the communication delay between means for allotting the request and each of the computers or terminals, and allotting the execution of the task request to the computer or terminal associated with the least of said sums.

* * * * *